US012207066B2

(12) United States Patent
Chu et al.

(10) Patent No.: US 12,207,066 B2
(45) Date of Patent: Jan. 21, 2025

(54) DISPLAY DEVICE, SOUND-EMITTING CONTROLLING METHOD, AND SOUND-EMITTING CONTROLLING DEVICE

(71) Applicants: Beijing BOE Optoelectronics Technology Co., Ltd., Beijing (CN); BOE Technology Group Co., Ltd., Beijing (CN)

(72) Inventors: Minglei Chu, Beijing (CN); Yanhui Xi, Beijing (CN); Xiaomang Zhang, Beijing (CN); Xiangjun Peng, Beijing (CN); Wenchao Han, Beijing (CN); Lianghao Zhang, Beijing (CN); Wei Sun, Beijing (CN); Rui Liu, Beijing (CN); Xin Duan, Beijing (CN); Tiankuo Shi, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 183 days.

(21) Appl. No.: 17/790,365

(22) PCT Filed: May 19, 2021

(86) PCT No.: PCT/CN2021/094627
§ 371 (c)(1),
(2) Date: Jun. 30, 2022

(87) PCT Pub. No.: WO2022/001451
PCT Pub. Date: Jan. 6, 2022

(65) Prior Publication Data
US 2023/0045236 A1 Feb. 9, 2023

(30) Foreign Application Priority Data
Jun. 29, 2020 (CN) ........................ 202010609539.2

(51) Int. Cl.
*H04S 7/00* (2006.01)
*H04R 3/12* (2006.01)
*H04R 5/02* (2006.01)

(52) U.S. Cl.
CPC ................ *H04R 5/02* (2013.01); *H04R 3/12* (2013.01)

(58) Field of Classification Search
CPC ................................... H04R 5/02; H04R 3/12
(Continued)

(56) References Cited

U.S. PATENT DOCUMENTS

2015/0003648 A1 1/2015 Kang
2016/0065791 A1 3/2016 Li et al.
(Continued)

FOREIGN PATENT DOCUMENTS

CN 104270552 A 1/2015
CN 105491474 A 4/2016
(Continued)

OTHER PUBLICATIONS

CN 202010609539.2 first office action.
(Continued)

*Primary Examiner* — William J Deane, Jr.
(74) *Attorney, Agent, or Firm* — IPro, PLLC

(57) ABSTRACT

The present disclosure provides a display device, a sound-emitting control method, and a sound-emitting control device. The device includes: a display screen which includes a first display region, a middle display region, and a second display region; a plurality of sound-emitting units, which include: a plurality of first sound-emitting units, a plurality of second sound-emitting units and a plurality of third sound-emitting units; the plurality of first sound-emitting units and the plurality of second sound-emitting units respectively include a sound-emitting unit which emits
(Continued)

sounds at a first frequency band, a sound-emitting unit which emits sounds at a second frequency band, and a sound-emitting unit which emits sounds at a third frequency band; the first, second, and third frequency bands increase in turn; and all of the plurality of third sound-emitting units are the sound-emitting units emitting sound in the second frequency band.

12 Claims, 5 Drawing Sheets

(58) Field of Classification Search
USPC .................................................... 381/17, 306
See application file for complete search history.

(56) References Cited

U.S. PATENT DOCUMENTS

| | | | | |
|---|---|---|---|---|
| 2017/0347218 | A1* | 11/2017 | Jeon | H04S 3/008 |
| 2020/0162804 | A1 | 5/2020 | Lee et al. | |
| 2020/0167122 | A1 | 5/2020 | Lee et al. | |
| 2020/0183637 | A1 | 6/2020 | Ahn et al. | |
| 2020/0314554 | A1 | 10/2020 | Xiao | |
| 2021/0360097 | A1* | 11/2021 | Sun | G06F 1/1626 |
| 2022/0103940 | A1* | 3/2022 | Han | G06F 3/147 |
| 2023/0045236 | A1* | 2/2023 | Chu | H04R 3/12 |
| 2023/0088530 | A1* | 3/2023 | Zhang | H04R 3/12 381/303 |
| 2023/0412979 | A1* | 12/2023 | Yoshioka | H04R 3/04 |

FOREIGN PATENT DOCUMENTS

| | | | |
|---|---|---|---|
| CN | 107561753 | A | 1/2018 |
| CN | 108124224 | A | 6/2018 |
| CN | 108462917 | A | 8/2018 |
| CN | 108806560 | A | 11/2018 |
| CN | 108833638 | A | 11/2018 |
| CN | 109144249 | A | 1/2019 |
| CN | 109194796 | A | 1/2019 |
| CN | 109274998 | A | 1/2019 |
| CN | 110018809 | A | 7/2019 |
| CN | 110312032 | A | 10/2019 |
| CN | 110572760 | A | 12/2019 |
| CN | 210090908 | U | 2/2020 |
| CN | 110874203 | A | 3/2020 |
| CN | 111225314 | A | 6/2020 |
| CN | 111314823 | A | 6/2020 |
| CN | 111741412 | A | 10/2020 |
| EP | 3264167 | B1 | 3/2019 |
| EP | 3331251 | B1 | 9/2021 |
| KR | 20200056741 | A | 5/2020 |

OTHER PUBLICATIONS

CN 202010609539.2 second office action.

PCT/CN2021/094627 international search report and written opinion.

* cited by examiner

DISPLAY DEVICE, SOUND-EMITTING CONTROLLING METHOD, AND SOUND-EMITTING CONTROLLING DEVICE

CROSS-REFERENCE TO RELATED APPLICATIONS

This application is the U.S. national phase of PCT Application No. PCT/CN2021/094627 filed on May 19, 2021, which claims priority of Chinese Patent Application No. 202010609539.2 filed in China on Jun. 29, 2020, the disclosures of which are incorporated in their entirety by reference.

TECHNICAL FIELD

The application relates to the field of display technology, in particular to a display device, a sound-emitting controlling method, and a sound-emitting controlling device.

BACKGROUND

With the development of display technology, users of the display device not only requires the display quality and definition, but also pays attention to the output effect of sound. They tend to prefer display devices that can realize integration of sound and picture, such display devices are capable of providing perfect integration of display picture and playing sound.

Therefore, it is an object of the structural design of current display devices to provide display devices that can realize integration of sound and picture.

SUMMARY

An object of the technical solutions of the present disclosure is to provide a display device, a sound-emitting control method and a sound-emitting control device, which are capable of realizing the integration of sound and picture of the display device.

An embodiment of the present disclosure provides a display device, which includes:

- a display screen, which includes a first display region, a middle display region, and a second display region arranged sequentially along a first direction;
- a plurality of sound-emitting units, which are arranged on a side facing away from the display screen,
- wherein the plurality of the sound-emitting units include:
  - a plurality of first sound-emitting units, a plurality of second sound-emitting units and a plurality of third sound-emitting units, the orthographic projection of the first sound-emitting units on the plane of the display screen is located in the first display region, the orthographic projection of the second sound-emitting units on the plane of the display screen is located in the second display region, and the orthographic projection of the third sound-emitting units on the plane of the display screen is located in the third display region;
- wherein the plurality of the first sound-emitting units and the plurality of the second sound-emitting units respectively include at least a sound-emitting unit emitting sound at a first frequency band, a sound-emitting unit emitting sound at a second frequency band, and a sound-emitting unit emitting sound at a third frequency band; wherein the first frequency band, the second frequency band, and the third frequency band increase in turn; and all of the plurality of the third sound-emitting units are the sound-emitting units emitting sound at the second frequency band.

Optionally, in the display device, wherein the orthographic projection of the plurality of the third sound-emitting units on the plane of the display screen are evenly distributed in the middle display region, each of the third sound-emitting units corresponds to a sub-region of the middle display region.

Optionally, in the display device, wherein each of the sound-emitting units includes an exciter and a vibration panel, respectively, wherein the exciter is mounted on the vibration panel, and the exciter drives the vibration panel to vibrate so as to generate sound.

Optionally, in the display device, wherein the display device includes a display panel, one surface of the display panel is the display screen, wherein the display panel includes a plurality of sub-panels, and one of the plurality of sub-panels is reused as the vibration panel.

Optionally, in the display device, wherein the plurality of the sub-panels are combined to form the display panel.

Optionally, in the display device, wherein the first display region and the second display region are equal in area and the area of the middle display region is at least twice the area of the first display region.

The embodiment of the present disclosure also provides a sound-emitting controlling method, wherein the method is applied to any of the above-mentioned display devices, and the method includes the following steps:

- acquiring video data and audio data of audio and video data to be output;
- detecting a sound-emitting position of a sound-emitting object in a target image frame when the target image frame of the video data is displayed on the display screen, and determining the third sound-emitting unit corresponding to the sound-emitting position;
- extracting a target sound-emitting signal corresponding to the sound-emitting object from an audio signal corresponding to the target image frame of the audio data, and converting the audio signal into a left channel signal, a middle channel signal, and a right channel signal; and
- outputting the left channel signal to the plurality of the first sound-emitting units, outputting the right channel signal to the plurality of the second sound-emitting units, outputting the middle channel signal to at least one of the third sound-emitting units, and outputting the target sound-emitting signal to the third sound-emitting unit corresponding to the display position.

Optionally, in the sound-emitting control method, wherein the step of detecting a sound-emitting position of a sound-emitting object in a target image frame when the target image frame of the video data is displayed on the display screen includes:

- separating the audio data into left channel data and right channel data;
- performing sound image positioning calculation according to the left channel data and the right channel data to determine sound image positioning information; and
- determining the sound-emitting position of the sound-emitting object in the target image frame according to the sound image positioning information and a result of frame difference processing on the target image frame of the video data.

Optionally, in the sound-emitting control method, wherein in the step of outputting the middle channel signal to at least one of the third sound-emitting units:

the orthographic projection of the third sound-emitting units, where the middle channel signal is outputted, on the plane of the display screen is located in the middle position of the middle display region.

Optionally, in the sound-emitting control method, wherein the step of outputting the middle channel signal to at least one of the third sound-emitting units includes:

converting the middle channel signal into a plurality of sub-channel signals, wherein each sub-channel signal corresponds to one of the third sound-emitting units;

sending each sub-channel signal to the corresponding third sound-emitting unit respectively.

Optionally, in the sound-emitting control method, wherein when the third sound-emitting units which output the middle channel signal and the target sound-emitting signal are the same sound-emitting unit, the middle channel signal and the target sound-emitting signal are combined and output to the corresponding third sound-emitting unit.

The embodiment of the present application further provides the sound-emitting control device, wherein the sound-emitting control device which is applied on any one of the above-mentioned display devices, the device includes:

a data acquisition module, which is used for acquiring the video data and the audio data of audio and video data to be output;

a detection module, which is used for detecting a sound-emitting position of a sound-emitting object in a target image frame when the target image frame of the video data is displayed on the display screen, and determining the third sound-emitting unit corresponding to the sound-emitting position;

a conversion module, which is used for extracting a target sound-emitting signal corresponding to the sound-emitting object from an audio signal corresponding to the target image frame of the audio data, and converting the audio signal into a left channel signal, a middle channel signal, and a right channel signal; and an output module, which is used for outputting the left channel signal to the plurality of the first sound-emitting units, outputting the right channel signal to the plurality of the second sound-emitting units, outputting the middle channel signal to at least one of the third sound-emitting units, and outputting the target sound-emitting signal to the third sound-emitting unit corresponding to the display position.

BRIEF DESCRIPTION OF THE DRAWINGS

In order to describe the technical solutions in the embodiments or related art of the disclosure document more clearly, the drawings required to be used in descriptions about the embodiments will be simply introduced below. It is apparent that the drawings described below are only some embodiments of the disclosure document. Other drawings can further be obtained by those ordinary skilled in the art according to these drawings without creative work.

DETAILED DESCRIPTION

In order to make the technical problems, technical solutions, and advantages of the present disclosure clearer, a detailed description will be given below with reference to the accompanying drawings and specific embodiments.

Figure 1:
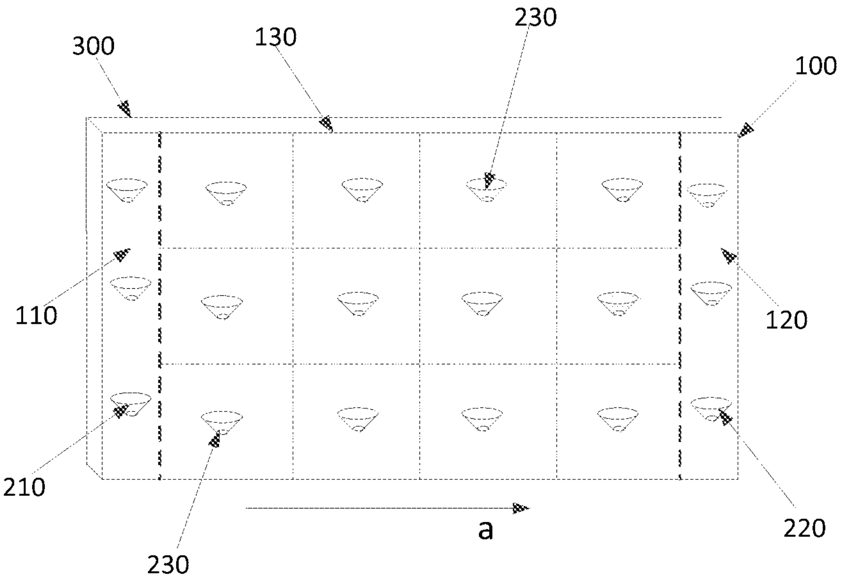
FIG. 1 is a schematic structural diagram of a display device according to an embodiment of the present disclosure.

In order to realize the integration of sound and picture of display devices, an embodiment of the present disclosure provides a display device, as shown in FIG. 1, wherein the display device includes:

a display screen 100, including a first display region 110, a middle display region 130, and a second display region 120 arranged sequentially along a first direction a;

a plurality of sound-emitting units, which are arranged on a side facing away from the display screen 100, wherein the plurality of the sound-emitting units include: a plurality of first sound-emitting units 210, a plurality of second sound-emitting units 220 and a plurality of third sound-emitting units 230, the orthographic projection of the first sound-emitting units 210 on the plane of the display screen 100 is located in the first display region 110, the orthographic projection of the second sound-emitting units 220 on the plane of the display screen 100 is located in the second display region 120, and the orthographic projection of the third sound-emitting units 230 on the plane of the display screen 100 is located in the third display region 130;

wherein the plurality of the first sound-emitting units 210 and the plurality of the second sound-emitting units 220 respectively include at least a sound-emitting unit emitting sound at a first frequency band, a sound-emitting unit emitting sound at a second frequency band, and a sound-emitting unit emitting sound at a third frequency band; wherein the first frequency band, the second frequency band, and the third frequency band increase in turn; and all of the plurality of the third sound-emitting units 230 are the sound-emitting units emitting sound at the second frequency band.

In the embodiments of the present disclosure, optionally, the first direction a is a horizontal direction, and can be a horizontal direction to the right; since the settings of the plurality of first sound-emitting units 210, the plurality of second sound-emitting units 220, and the plurality of third sound-emitting units 230 respectively correspond to the first display region 110, the second display region 120, and the middle display region 130 arranged sequentially along the first direction a, the first display region 110, the middle display region 130, and the second display region 120 respectively form a left channel play region, a middle channel play region, and a right channel play region of the display device; so as to form the whole display screen as a sound-emitting screen, that is to say, form the effect that the sound-emitting units are distributed and arranged on the whole display screen, and make sounds are emitted by the whole display screen.

In an embodiment of the present disclosure, optionally, the plurality of first sound-emitting units 210 correspond to the first display region 110, the plurality of second sound units 220 correspond to the second display region 120, and the plurality of third sound units 230 correspond to the middle display region 130, respectively, in a uniform distribution.

In the embodiments of the present disclosure, the plurality of first sound-emitting units 210 and the plurality of second sound-emitting units 220 respectively include a sound-emitting unit emitting sound in a first frequency band, a sound-emitting unit emitting sound in a second frequency band, and a sound-emitting unit emitting sound in a third frequency band, wherein the first frequency band, the second frequency band, and the third frequency band increase in turn, and optionally, the first frequency band, the second frequency band, and the third frequency band respectively correspond to sounds in three frequency bands, namely, a high frequency band, a middle frequency band, and a low frequency band. In this way, by arranging sound-emitting units of three frequency bands, namely, a high frequency band, a middle frequency band, and a low frequency band in the left and right channel playing regions corresponding to the display screen respectively, the playing requirements of each frequency band can be met, so as to meet the user's requirements for the sound of each frequency band.

Furthermore, all of the plurality of third sound-emitting units 230 are sound-emitting units which emit sound in the second frequency band, wherein the second frequency band is the middle frequency band, and the plurality of third sound-emitting units 230 corresponding to the middle display region 130 can satisfy the playing requirements of the middle channel.

Therefore, by using the display device according to the embodiments of the present disclosure, the plurality of first sound-emitting units 210 corresponding to the first display region, the plurality of second sound-emitting units 220 corresponding to the second display region and the plurality of third sound-emitting units 230 corresponding to the middle display region are provided, and the sound-emitting units corresponding to different display regions satisfy different frequency band requirements, so that the whole display screen is formed as a sound-emitting screen, and the sound-emitting screen has a left channel playing region, a middle channel playing region, and a right channel playing region. When the display screen is used for image display, the left channel playing region, the middle channel playing region, and the right channel playing region of the whole display screen are used for sound playing, which can satisfy the playing requirements of integration of sound and picture.

In an embodiment of the present disclosure, optionally, the orthographic projections of the plurality of the third sound-emitting units 230 on the plane, where the display screen 100 is located, are evenly distributed in the middle display region 130, each of the third sound-emitting units 230 corresponds to a sub-region of the middle display region.

The middle display region 130 is divided into a plurality of sub-regions, and the third sound-emitting unit 230 is respectively arranged in each sub-region, so that when the display screen displays an image, the corresponding third sound-emitting unit 230 can be controlled to emit sound according to the position of the human face image displayed on the image in the middle display region 130, so as to realize a sound and picture integrated playing effect.

For example, the middle display region 130 includes M×N sub-regions, M and N are respectively positive integers, such as M and N are respectively 3, that is to say, the middle display region 130 includes 3×3 sub-regions, at least one third sound-emitting unit 230 is provided for each sub-region, and the third sound-emitting units 230 of each sub-region can emit sound individually so as to satisfy the playing requirements of the middle sound channel.

In the embodiments of the present disclosure, it should be noted that the first frequency band, the second frequency band, and the third frequency band respectively correspond to high, middle, and low frequency band sounds, and specifically correspond to the frequency ranges of the high, middle, and low frequency bands, which can be determined according to specific provisions in the industry, and are not limited herein.

In an embodiment of the present disclosure, optionally, each of the sound-emitting units includes an exciter and a vibration panel, respectively, wherein the exciter is mounted on the vibration panel, and the exciter drives the vibration panel to vibrate so as to generate sound.

In this manner, the vibration sound wave is transmitted to human ears by using the vibration panel as a vibration body. That is, when the sound-emitting unit emits sounds, the sound output can be realized by using the vibration panel as the vibration body without a loudspeaker and an earphone.

In an embodiment of the present disclosure, as shown in FIG. 1, the display device includes a display panel 300, one surface of the display panel is the display screen, wherein the display panel 300 includes a plurality of sub-panels, and one of the plurality of sub-panels is reused as the vibration panel.

By using the present embodiment, among the plurality of sub-panels of the display panel 300, each of the sub-panels serves as a vibration body and is driven by the exciter to generate sound waves, thereby achieving sound output. Optionally, the plurality of sub-panels are arranged in one-to-one correspondence with a plurality of lasers.

By using the implementation structure for performing sound emitting by vibration of the sub-panel of the display panel 300, the display device is capable of transmitting the sounds by vibration of the sub-panel without providing the loudspeaker and the earphone, and is configured as a screen sound-emitting technology. Compared with the display device provided with the earphone and the loudspeaker, the display device adopting the implementation structure can further improve a screen-to-body ratio and ensure a real full-screen effect.

Furthermore, when displaying an image, a display device using a screen to perform sound emitting can judge the sound-emitting position of the sound-emitting object on the image according to the displayed image, and control the sub-panel at a corresponding position to vibrate and emit sounds according to the determined sound-emitting position, so as to truly realize a sound and picture integrated playing effect.

In an embodiment of the present disclosure, optionally, the plurality of the sub-panels are combined to form the display panel.

Specifically, each sub-panel is formed as the sound-emitting unit in combination with the provided exciter, and the plurality of sub-panels are combined to form the display panel including a large-area display screen, and the display panel can achieve a screen sound-emitting effect while displaying the image.

Furthermore, by controlling the vibration frequency of the exciters to which the sub-panels are connected, and/or the sub-panels are made of different material properties, corresponding high, middle or low frequency sounds can be emitted.

In the display device according to the embodiment of the present disclosure, optionally, as shown in FIG. 1, the areas of the first display region 110 and the second display region 120 are equal, and the area of the middle display region 130 is at least twice the area of the first display region 110.

Optionally, making the area of the middle display region 130 far greater than the area of the first display region 110 and the second display region 120, such that the first display region 110 and the second display region 120 are respectively arranged corresponding to the left and right side edges of the display region to form corresponding left channel playing region and right channel playing region; the middle display region 130 is used for displaying a main part of an output image, and is able to control a sub-region at a corresponding position to emit sound waves according to the sound emitting position on the output image in the middle display region 130, so as to realize the sound and picture integrated playing effect The display device according to the above-mentioned embodiments of the present disclosure uses a sound-emitting screen formed by splicing an excitation source and the plurality of sub-panels together, wherein the plurality of sound-emitting units formed by the excitation source and the sub-panels correspond to the first display region and the second display region of the display screen, respectively at least include the sound-emitting units emitting the high-frequency sound, a middle-frequency sound, and a low-frequency sound which correspond to a middle display region of the display screen, respectively are sound-emitting units for generating the middle-frequency sound, and can ensure the middle-frequency sound to be played while satisfying the sound playing of the left and right channels, so as to satisfy the user's requirements for sounds of each frequency band. On this basis, when the display screen is used for image display, the left channel playing region, the middle channel playing region, and the right channel playing region of the whole display screen are used for sound playing, which can satisfy the playing requirements of integration of sound and picture.

Figure 2:
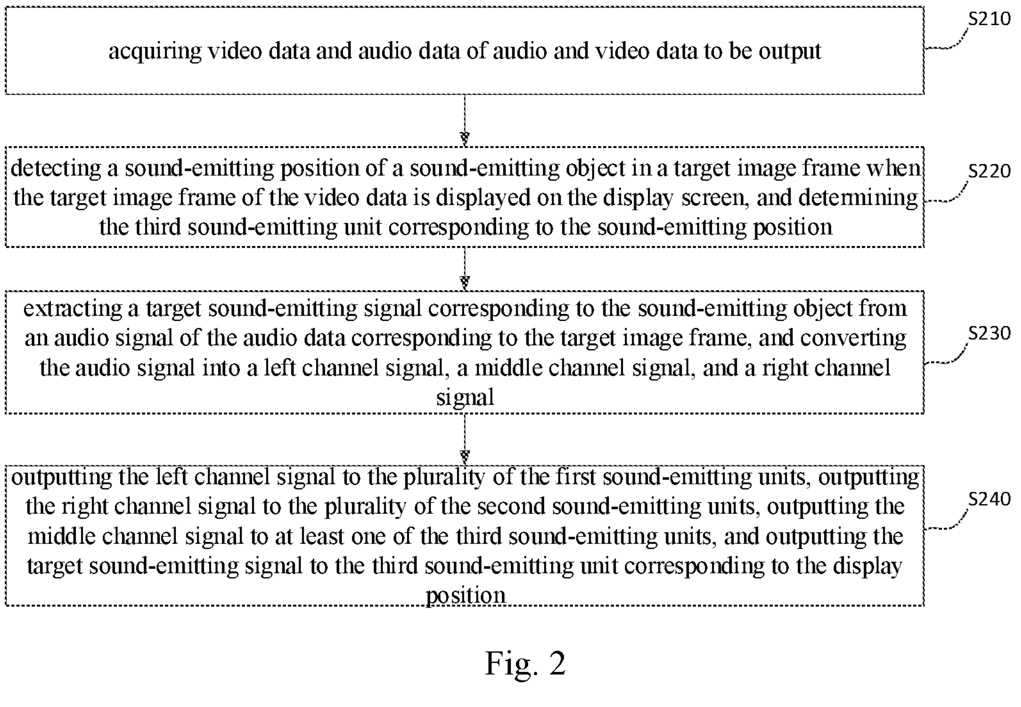
FIG. 2 is a schematic flow diagram of one embodiment of a sound-emitting control method according to an embodiment of the present disclosure.

Embodiments of the present disclosure further provide a sound-emitting control method applied to any of the above-mentioned display devices, as shown in FIG. 2, combined with FIG. 1, the method includes:

S210, acquiring video data and audio data of audio and video data to be output;

S220, detecting a sound-emitting position of a sound-emitting object in a target image frame when the target image frame of the video data is displayed on the display screen, and determining the third sound-emitting unit corresponding to the sound-emitting position;

S230, extracting a target sound-emitting signal corresponding to the sound-emitting object from an audio signal corresponding to the target image frame of the audio data, and converting the audio signal into a left channel signal, a middle channel signal, and a right channel signal; and

S240, outputting the left channel signal to the plurality of the first sound-emitting units, outputting the right channel signal to the plurality of the second sound-emitting units, outputting the middle channel signal to at least one of the third sound-emitting units, and outputting the target sound-emitting signal to the third sound-emitting unit corresponding to the display position.

By using the sound-emitting control method described in the embodiments of the present disclosure, the display screen divided into the left channel playing region, the right channel playing region, and a middle channel playing region are used, when audio and video data are output, the video data and audio data are separated, sound-emitting object are detected and positioned on a target image frame, and an object sound-emitting signal is detected and separated on an audio signal corresponding to the target image frame, so that the left channel signal is output to the plurality of first sound-emitting units corresponding to the first display region, and the right channel signal is output to the plurality of second sound-emitting units corresponding to the second display region; and middle channel signals are output to the plurality of third sound-emitting units corresponding to the middle display region, and the corresponding third sound-emitting units are controlled to output target sound-emitting signals corresponding to the sound-emitting object images according to the position of the located sound-emitting object images, so that the requirements of sound-picture integration can be met.

Specifically, a full-screen sound-emitting display screen can be realized, the plurality of first sound-emitting units and the plurality of second sound-emitting units corresponding to the left and right channel playing regions are respectively used for playing the left and right channel signals of audio data, and the plurality of third sound-emitting units corresponding to the middle channel playing region are used for playing the middle channel signals of audio data and locating corresponding target sound-emitting signals according to the sound-emitting object image.

It should be noted that since the middle sound channel is often used for playing main sound signals in all audio, such as person dialogue, etc. that is to say, most of the sound information about the person in the audio data is the middle frequency signal, the third sound-emitting unit used for emitting the middle frequency sound is used to play the middle sound channel signal, and the left and right sound channels are generally used for playing audio signals such as environment and sound effect enhancement, etc. so as to enhance the sound signal played in the middle channel, and there are signals in each frequency band; therefore, the plurality of first sound-emitting units and the plurality of second sound-emitting units which emit high, middle, and low frequency sounds are used to play the left and right sound channel signals.

It should be noted that, in the embodiments of the present disclosure, the sound-emitting object in the video data includes but is not limited to being able to include only human face images, animal head images, and sound-emitting machines, etc.

Figure 3:
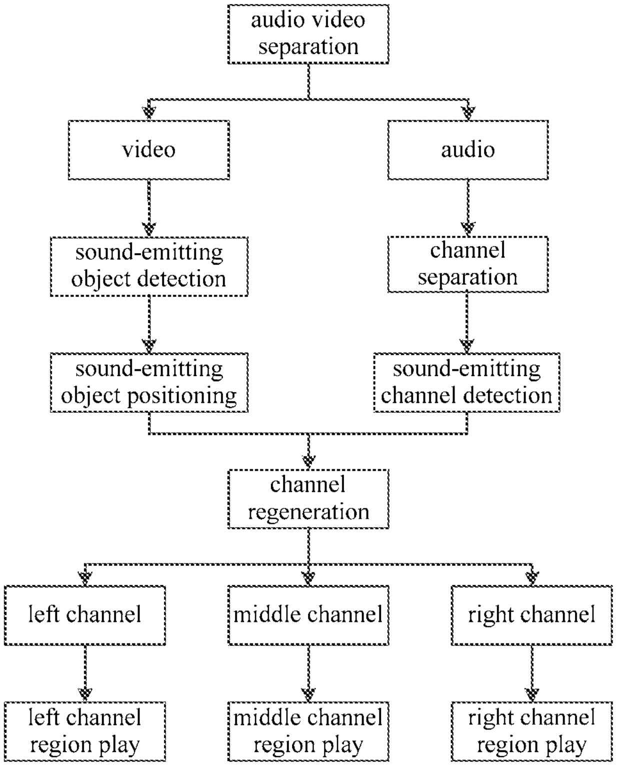
FIG. 3 is a schematic flow diagram of another embodiment of a sound-emitting control method according to an embodiment of the present disclosure.

In one embodiment, in step S220, detecting the sound-emitting position of the sound-emitting object in the target image frame when the target image frame of the video data is displayed on the display screen, as shown in FIG. 3, specifically includes:

performing sound-emitting object detection and sound-emitting object positioning on the image in the video data according to the video data and audio data in the audio-video data extracted in step S210;

specifically, by performing image recognition analysis on the target image frame of the video data, a sound-emitting object known to have a specific shape in the target image frame can be analyzed, such as a human face, an animal head, a sound-emitting machine and so on, and on this basis, further image recognition can be used to determine the position of the sound-emitting object in the target image frame.

In addition, in the process of performing sound-emitting object detection and sound-emitting object positioning on the image in the video data, by performing channel separation on the audio data and performing sound-emitting signal detection on each separated sub-channel, a sound-emitting signal of the sound-emitting object in the target image frame can be detected; matching the detected sound-emitting signal with the identified sound-emitting object in the video data enables the relationship between the sound-emitting object and the corresponding sound-emitting signal to be determined, thereby determining the sound-emitting position of the sound-emitting object in the target image frame.

It should be noted that, by using the present embodiment, the sound-emitting position of the sound-emitting object in the target image frame is detected, and since image recognition analysis needs to be performed on the target image frame to determine the sound-emitting object in the target image frame, it is limited to be applied to a scene capable of determining the sound-emitting object in the target image frame.

Referring to FIG. 3, in the present embodiment, by using the sound-emitting control method according to an embodiment of the present disclosure, the method includes: audio and video are separated, sound-emitting object detection and sound-emitting object positioning are performed by using the separated video data, and channel separation and sound-emitting signal detection are performed according to the separated audio data; the sound-emitting position of the sound-emitting object in the target image frame is determined by performing the sound-emitting object positioning and the sound-emitting signal detection, and the third sound-emitting unit corresponding to the sound-emitting position are determined; after the sound-emitting object is located and the sound signal is detected, channel regeneration is performed, the left channel signal, the middle channel signal, and the right channel signal are separated, and the left channel signal is played in a left channel region, the right channel signal is played in a right channel region, and the middle channel signal is played in a middle channel region respectively.

Optionally, in one embodiment, when channel separation and object sound-emitting detection are performed, the separated audio signals generally have 2.0, 2.1, 5.1 channels, etc. wherein the 2.0 channel is relatively common; when channel separation is performed, the audio signal of the above-mentioned initial channels is separated into various sub-channels; when object sound-emitting object is detected, whether the object sound-emitting signal exists in each sub-channel is detected respectively; optionally, the method for detecting an object sound-emitting signal can use a detection model trained by TensorFlow, such as when human voices is detected; and human voice detection was performed by using a spleeter library in ffmpeg as the human voice detection model.

Figure 4:
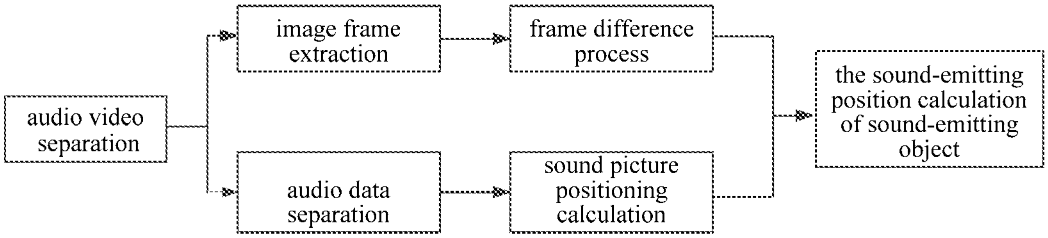
FIG. 4 is a schematic flow diagram of determining the sound-emitting position of a sound-emitting object in one of the embodiments of a sound-emitting control method described in embodiments of the present disclosure.

In an embodiment of the present disclosure, optionally, in another embodiment, in step S220, when the target image frame of the video data is displayed on the display screen, detecting the sound-emitting position of the sound-emitting object of the target image frame in the target image frame, as shown in FIG. 4, which includes:

separating the audio data into left channel data and right channel data;

performing sound image positioning calculation according to the left channel data and the right channel data to determine sound image positioning information; and determining the sound-emitting position of the sound-emitting object in the target image frame according to the sound image positioning information and a result of frame difference processing on the target image frame of the video data.

Figure 5:
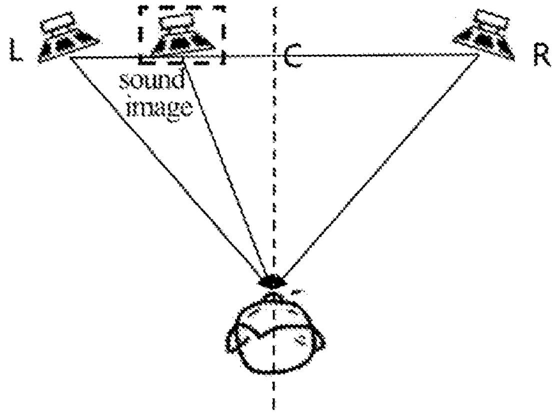
FIG. 5 is a schematic structural diagram illustrating the meaning of sound image.

Specifically, as shown in FIG. 5, the meaning of the sound image is: when two loudspeakers are used for stereo playing, the listener does not perceive the presence of two sound sources, but perceives as if a spatial point between the two loudspeakers emit sounds, which is regard as the sound image.

When the signals of the left and right channels are the same, the sound image is in the middle position of the left and right channels;

when there is a time difference and/or intensity difference between the signals of the left and right channels, the sound image will shift; and the positioning of the sound image is achieved by the time difference and/or the intensity difference between the signals of the left and right channels.

Figure 6:
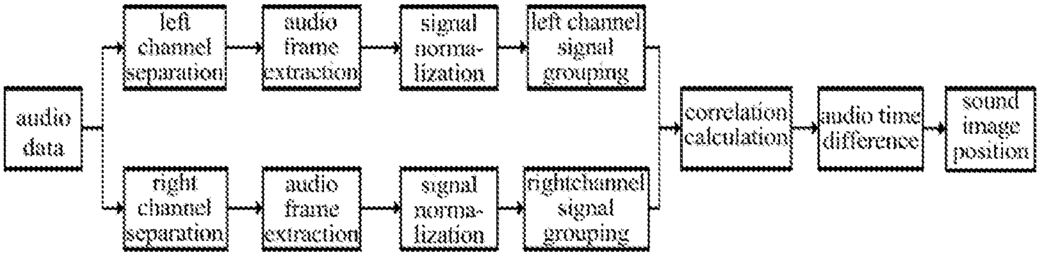
FIG. 6 is a schematic flow diagram of a portion of a process of performing positioning calculation of sounds and images shown in FIG. 4.
Figure 7:
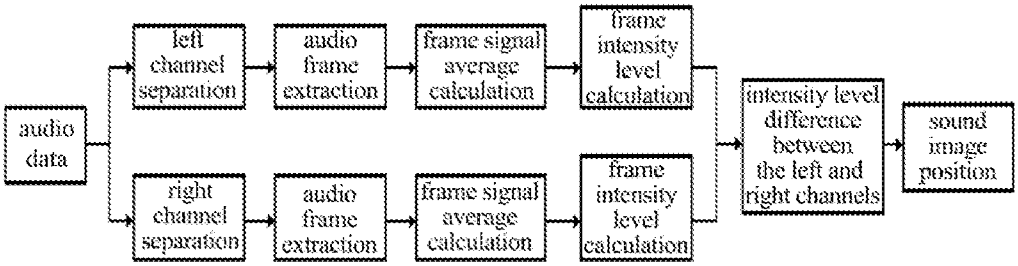
FIG. 7 is a schematic flow diagram of another portion of a process of performing positioning calculation of sounds and images shown in FIG. 4.

Based on this, the sound image positioning information includes an audio time difference and an intensity level difference between a left channel signal and a right channel signal, and in an embodiment of the present disclosure, performing sound image positioning calculation according to the left channel data and the right channel data to determine sound image positioning information, which includes:

as shown in FIG. 6, performing cross-correlation calculation by using the left channel signal and the right channel signal to determine the audio time difference of the target image frame;

as shown in FIG. 7, using the left channel signal and the right channel signal, respectively performing frame signal average calculation and left and right channel intensity calculation, and determining the intensity level difference between the left channel signal and the right channel signal; and determining the sound image location information according to the audio time difference and the intensity level difference.

In the disclosed embodiment, optionally, the separated left and right channel signals in the audio data are Pulse Code Modulation (PCM) signals.

In addition, according to FIG. 6, before performing the cross-correlation calculation, it is also necessary to respectively perform signal normalization on the left channel signal and signal grouping on the right channel signal in sequence;

performing the cross-correlation calculation includes: the left channel signal and the right channel signal are respectively calculated by ITD and analyzed by a cross-correlation function to determine the audio time difference of the target image frame.

Figure 8:
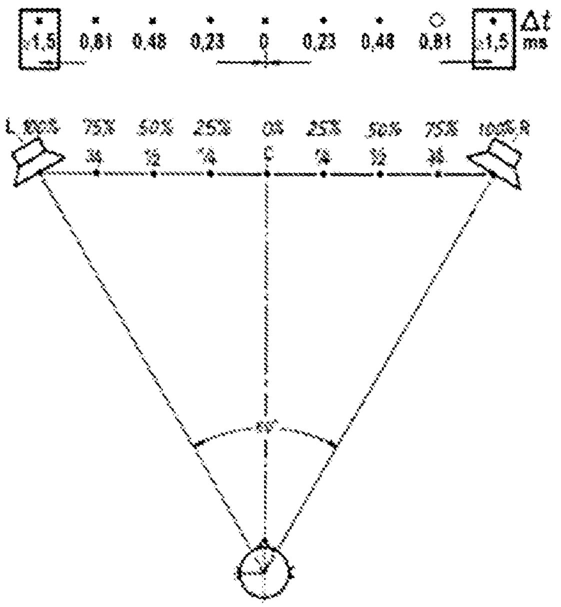
FIG. 8 is a schematic structural diagram illustrating a relationship between an audio time difference and a sound image position.

Specifically, from the determined audio time difference, the sound image position in the lateral direction of the display screen can be determined according to a corresponding relationship between the sound image straight line positioning percentage and the audio time difference represented in FIG. 8.

Figure 9:
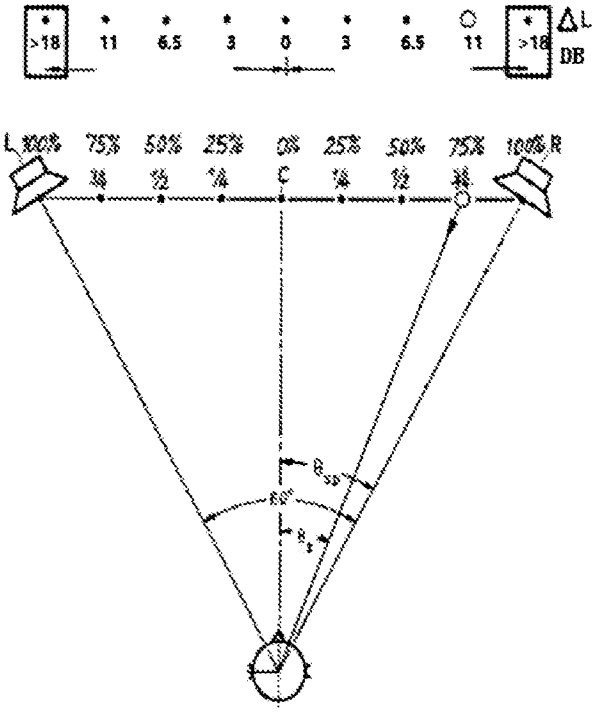
FIG. 9 is a schematic structural diagram illustrating the relationship between the intensity level difference of the left and right channels and a sound image position.

In the embodiment of the present disclosure, combined with FIG. 7, after the frame signal average calculation and the intensity calculation between the left and right channels are performed and the intensity level difference between the left channel signal and the right channel signal is determined, the sound image position in the longitudinal direction of the display screen can be determined according to the corresponding relationship between the sound image straight line positioning percentage and the intensity level difference between the left and right channel signals as shown in FIG. 9.

According to the above-mentioned principle, the audio time difference between the left channel signal and the right channel signal and the intensity level difference calculated in the above-mentioned manner are used to determine the sound image positioning information of the sound-emitting object.

On this basis, the motion state of the current video frame is calculated by using a frame difference method, and the audio time difference and intensity level difference obtained by the above-mentioned process are combined to determine the sound-emitting position of the sound-emitting object in the target image frame.

In the above-mentioned embodiments, specifically, the audio signal is separated into left and right channel signals, and format conversion is performed to obtain a time stamp and signal data of each audio frame; on this basis, the cross-correlation function and the calculation of the relative position between the signals are used to calculate the sound image positioning and obtain the horizontal sound image position on the display screen. On the basis of the calculated horizontal position, the longitudinal sound image position on the screen can be obtained, and then the frame difference processing can be used to determine the sound-emitting position of the sound-emitting object in the object sound-emitting signal. By using the present embodiment, it is not necessary to perform image analysis according to the target image frame obtained by separation to obtain the sound-emitting object, and therefore it is possible to analyze the sound-emitting position of the sound-emitting object on the basis of uncertainty of the sound-emitting object.

In step S230, when the target sound-emitting signal of the audio signal corresponding to the target image frame in the audio data is extracted, the target sound-emitting signal can be determined according to the above-mentioned sound image positioning information.

Optionally, when the sound-emitting object is human, a human voice model can be used to detect each sub-channel signal to determine a target sound-emitting signal.

Furthermore, in the embodiments of the present disclosure, by using the above-mentioned two embodiments, after determining the sound-emitting position of the sound-emitting object of the target image frame in the target image frame, the playing region of the display screen can be determined according to the sound-emitting position, and according to the corresponding relationship between the plurality of third sound-emitting units and the display region, that is to say, the third sound-emitting units corresponding to the sound-emitting position can be determined, that is to say, the target sound-emitting channel is determined.

In the embodiments of the present disclosure, furthermore, by using the above-mentioned two embodiments, after determining the sound-emitting position of the sound-emitting object of the target image frame in the target image frame, the audio data is separated into the left channel, the right channel, the middle channel, and the target sound-emitting channel by performing the channel regeneration, and when playing, the left and right channels are played in the left and right channel playing region, the middle channel is played in the middle channel playing region, and the target sound-emitting channel is used for playing the target sound-emitting signal of the sound-emitting object. Specifically, when the target sound channel coincides with the other channel position channels, the channels are merged and then are used for playing.

In general, the conversion manner between channels can be changed from 2 channel to 3 channel or from 2 channel to multiple channels.

In another embodiment of the present disclosure, by performing the channel regeneration, the audio data is separated into the left channel, the right channel, and the target sound-emitting channel, and furthermore, with regard to each sub-region of the middle channel playing region, each sub-region is respectively provided with at least one third sound-emitting unit; the middle channel signal of the audio data is respectively divided into the plurality of sub-channel signals, and each sub-channel signal corresponds to the channel of one sub-region; for example, when the middle channel playing region includes sub-regions 1 to 9, a total of nine sub-regions, the middle channel signal of the audio data is further divided into nine sub-channels by the channel regeneration; and each sub-channel signal respectively corresponds to the sub-region, and the third sound-emitting unit located in the sub-region is used for playing the corresponding sub-channel signal.

Specifically, when the target sound channel coincides with the other channel position channels, the channels are merged and then are used for playing.

Therefore, in the embodiments of the present disclosure, optionally, in one embodiment, in step S240, the step of outputting the middle channel signal to at least one of the third sound-emitting units includes:

- converting the middle channel signal into a plurality of sub-channel signals, wherein each sub-channel signal corresponds to one of the third sound-emitting units;
- sending each sub-channel signal to the corresponding third sound-emitting unit respectively.

Optionally, in one embodiment, in step S240, the step of outputting the middle channel signal to at least one of the third sound-emitting units includes:

- the orthographic projection of the third sound-emitting units, where the middle channel signal is outputted, on the plane of the display screen is located in the middle position of the middle display region.

In another embodiment, as described above, when the third sound-emitting units which output the middle channel signal and the target sound-emitting signal are the same sound-emitting unit, the middle channel signal and the target sound-emitting signal are combined and output to the corresponding third sound-emitting unit.

It should be noted that, in embodiments of the present disclosure, optionally, the target sound-emitting channels which are used for playing the target sound-emitting signals can include a third sound-emitting unit which is determined based on the sound-emitting position of the sound-emitting object described above.

In another embodiment, the target sound-emitting channels which are used for playing the target sound-emitting signal can include at least two third sound-emitting units, wherein the at least two third sound-emitting units are located in a part region of the corresponding middle display region and include the third sound-emitting unit determined according to the sound-emitting position of the above-mentioned sound-emitting object; in addition, all the third sound-emitting units can also be included, and in the present embodiment, when the target sound-emitting signals corresponding to the sound-emitting object are played by at least two third sound-emitting units, the sound played by the third sound-emitting unit determined by the sound-emitting position of the sound-emitting object can be greater than the sound played by the other third sound-emitting units, so that the requirements of sound-picture integration can be met.

Figure 10:
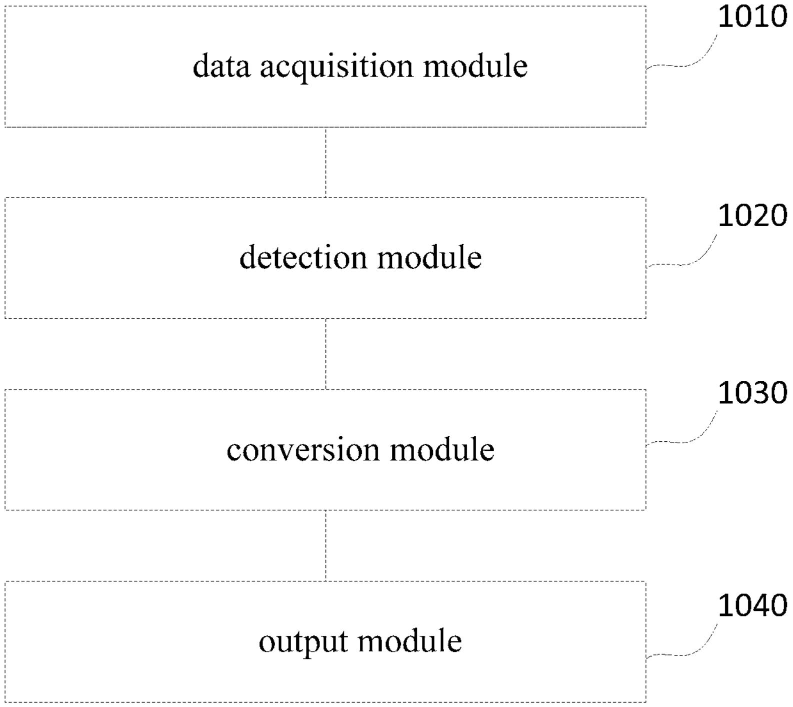
FIG. 10 is a schematic structural diagram of a sound-emitting control device according to an embodiment of the present disclosure.

According to another aspect of embodiments of the present disclosure, the sound-emitting control device is also provided, wherein the sound-emitting control device is applied to any of the above-mentioned display devices, as shown in FIG. 10, the device includes:

a data acquisition module 1010, which is used for acquiring the video data and the audio data of audio and video data to be output;

a detection module 1020, which is used for detecting a sound-emitting position of a sound-emitting object in a target image frame when the target image frame of the video data is displayed on the display screen, and determining the third sound-emitting unit corresponding to the sound-emitting position;

a conversion module 1030, which is used for extracting a target sound-emitting signal corresponding to the sound-emitting object from an audio signal corresponding to the target image frame of the audio data, and converting the audio signal into a left channel signal, a middle channel signal, and a right channel signal; and an output module 1040, which is used for outputting the left channel signal to the plurality of the first sound-emitting units, outputting the right channel signal to the plurality of the second sound-emitting units, outputting the middle channel signal to at least one of the third sound-emitting units, and outputting the target sound-emitting signal to the third sound-emitting unit corresponding to the display position.

Optionally, in the sound-emitting control device, wherein the step that the detection module 1020 detects the sound-emitting position of the sound-emitting object in a target image frame when the target image frame of the video data is displayed on the display screen includes:

separating the audio data into left channel data and right channel data;

performing sound image positioning calculation according to the left channel data and the right channel data to determine sound image positioning information; and determining the sound-emitting position of the sound-emitting object in the target image frame according to the sound image positioning information and a result of frame difference processing on the target image frame of the video data.

Optionally, in the sound-emitting control device, wherein in the step that the output module 440 outputs the middle channel signal to at least one of the third sound-emitting units:

the orthographic projection of the third sound-emitting units, where the middle channel signal is outputted, on the plane of the display screen is located in the middle position of the middle display region.

Optionally, the sound-emitting control device, wherein the step that the output module 440 outputs the middle channel signal to at least one of the third sound-emitting units includes:

converting the middle channel signal into a plurality of sub-channel signals, wherein each sub-channel signal corresponds to one of the third sound-emitting units;

sending each sub-channel signal to the corresponding third sound-emitting unit respectively.

Optionally, the sound-emitting control device, wherein when the third sound-emitting units which output the middle channel signal and the target sound-emitting signal are the same sound-emitting unit, the output module 440 combines the middle channel signal and the target sound-emitting signal and outputs the combined signal to the corresponding third sound-emitting unit.

While the foregoing is directed to alternative embodiments of the present disclosure, it should be understood by those skilled in the art that various improvements and modifications may be made without departing from the principle of the present disclosure, and theses improvement and modifications shall fall within the scope of protection of the present disclosure.

What is claimed is:

1. A display device, comprising:

a display screen, comprising a first display region, a middle display region, and a second display region arranged sequentially along a first direction;

a plurality of sound-emitting units, arranged on a side facing away from the display screen, wherein the plurality of the sound-emitting units comprise: a plurality of first sound-emitting units, a plurality of second sound-emitting units and a plurality of third sound-emitting units, the orthographic projection of the first sound-emitting units on the plane of the display screen is located in the first display region, the orthographic projection of the second sound-emitting units on the plane of the display screen is located in the second display region, and the orthographic projection of the third sound-emitting units on the plane of the display screen is located in the third display region;

wherein the plurality of the first sound-emitting units and the plurality of the second sound-emitting units respectively comprise at least a sound-emitting unit emitting sound at a first frequency band, a sound-emitting unit emitting sound at a second frequency band, and a sound-emitting unit emitting sound at a third frequency band; wherein the first frequency band, the second frequency band, and the third frequency band increase in turn; and all of the plurality of the third sound-emitting units are the sound-emitting units emitting sound at the second frequency band.

2. The display device according to claim 1, wherein the orthographic projection of the plurality of the third sound-emitting units on the plane of the display screen are evenly distributed in the middle display region, each of the third sound-emitting units corresponds to a sub-region of the middle display region.

3. The display device according to claim 1, wherein each of the sound-emitting units comprises an exciter and a vibration panel respectively, wherein the exciter is mounted on the vibration panel, the exciter drives the vibration panel to vibrate so as to generate sound.

4. The display device according to claim 3, wherein the display device comprises a display panel, one surface of the display panel is the display screen, wherein the display panel comprises a plurality of sub-panels, and one of the plurality of sub-panels is reused as the vibration panel.

5. The display device according to claim 4, wherein the plurality of sub-panels are combined to form the display panel.

6. The display device according to claim 1, wherein the first display region and the second display region are equal in area, and the area of the middle display region is at least twice the area of the first display region.

7. A sound-emitting control method, applied to the display device according to claim 1, the method comprising:

acquiring video data and audio data of audio and video data to be output;

detecting a sound-emitting position of a sound-emitting object in a target image frame when the target image frame of the video data is displayed on the display screen, and determining the third sound-emitting unit corresponding to the sound-emitting position;

extracting, from an audio signal corresponding to the target image frame of the audio data, a target sound-emitting signal corresponding to the sound-emitting object, and converting the audio signal into a left channel signal, a middle channel signal, and a right channel signal; and outputting the left channel signal to the plurality of the first sound-emitting units, outputting the right channel signal to the plurality of the second sound-emitting units, outputting the middle channel signal to at least one of the third sound-emitting units, and outputting the target sound-emitting signal to the third sound-emitting unit corresponding to the display position.

8. The sound-emitting control method according to claim 7, wherein the detecting a sound-emitting position of a sound-emitting object in a target image frame when the target image frame of the video data is displayed on the display screen comprises:

separating the audio data into left channel data and right channel data;

performing sound image positioning calculation according to the left channel data and the right channel data to determine sound image positioning information; and determining the sound-emitting position of the sound-emitting object in the target image frame according to the sound image positioning information and a result of frame difference processing on the target image frame of the video data.

9. The sound-emitting control method according to claim 7, wherein in the step of outputting the middle channel signal to at least one of the third sound-emitting units:

the orthographic projection of the third sound-emitting units, where the middle channel signal is outputted, on the plane of the display screen is located in the middle position of the middle display region.

10. The sound-emitting control method according to claim 7, wherein the outputting the middle channel signal to at least one of the third sound-emitting units comprises:

converting the middle channel signal into a plurality of sub-channel signals, wherein each sub-channel signal corresponds to one of the third sound-emitting units;

sending each sub-channel signal to the corresponding third sound-emitting unit respectively.

11. The sound-emitting control method according to claim 7, wherein when the third sound-emitting units which output the middle channel signal and the target sound-emitting signal are the same sound-emitting unit, the middle channel signal and the target sound-emitting signal are combined and output to the corresponding third sound-emitting unit.

12. A sound-emitting control device, applied to the display device according to claim 1, comprising:

a data acquisition module, configured for acquiring the video data and the audio data of audio and video data to be output;

a detection module, configured for detecting a sound-emitting position of a sound-emitting object in a target image frame when the target image frame of the video data is displayed on the display screen, and determining the third sound-emitting unit corresponding to the sound-emitting position;

a conversion module, configured for extracting a target sound-emitting signal corresponding to the sound-emitting object from an audio signal corresponding to the target image frame of the audio data, and converting the audio signal into a left channel signal, a middle channel signal, and a right channel signal; and an output module, configured for outputting the left channel signal to the plurality of the first sound-emitting units, outputting the right channel signal to the plurality of the second sound-emitting units, outputting the middle channel signal to at least one of the third sound-emitting units, and outputting the target sound-emitting signal to the third sound-emitting unit corresponding to the display position.

* * * * *